US008813059B2

(12) United States Patent
Sasaki (10) Patent No.: US 8,813,059 B2
(45) Date of Patent: Aug. 19, 2014

(54) DISPLAY APPARATUS WITH MEMORY STORING FIRMWARE AND NETWORK SYSTEM INCLUDING DISPLAY APPARATUS

(75) Inventor: Hiroyuki Sasaki, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 808 days.

(21) Appl. No.: 13/022,540

(22) Filed: Feb. 7, 2011

(65) Prior Publication Data

US 2011/0196667 A1 Aug. 11, 2011

(30) Foreign Application Priority Data

Feb. 8, 2010 (JP) ................................. 2010-025116

(51) Int. Cl.
*G06F 9/44* (2006.01)
*G06F 9/445* (2006.01)

(52) U.S. Cl.
USPC .......................................... 717/168; 717/174

(58) Field of Classification Search
CPC ............ G06F 9/4448; G06F 8/65; G06F 8/61
USPC .................................................. 717/168–178
See application file for complete search history.

(56) References Cited

U.S. PATENT DOCUMENTS

| 5,794,052 | A * | 8/1998 | Harding ........................ 717/178 |
| 7,055,149 | B2 * | 5/2006 | Birkholz et al. .............. 717/172 |
| 8,225,312 | B2 * | 7/2012 | DiCarlo et al. ............... 717/178 |
| 8,356,259 | B2 * | 1/2013 | Sugiura ......................... 715/840 |
| 2007/0288423 | A1 * | 12/2007 | Kimoto ............................. 707/1 |

FOREIGN PATENT DOCUMENTS

| EP | 1677176 A1 | 7/2006 |
| EP | 1930808 A1 * | 6/2008 |
| JP | H10-032669 A | 2/1998 |
| JP | 2000-163204 A | 6/2000 |
| JP | 2001-086286 A | 3/2001 |
| JP | 2001-270175 A | 10/2001 |
| JP | 2002-222068 A | 8/2002 |
| JP | 2002-281259 A | 9/2002 |
| JP | 2004-050585 A | 2/2004 |
| JP | 2004-112341 A | 4/2004 |
| JP | 2004-201008 A | 7/2004 |
| JP | 2004-272601 A | 9/2004 |

(Continued)

OTHER PUBLICATIONS

Japan Patent Office, Notification of Reasons for Refusal for Japanese Patent Application No. 2010-025116 (counterpart to above-referenced patent application), mailed Jun. 11, 2013.

(Continued)

*Primary Examiner* — Samuel G Neway
(74) *Attorney, Agent, or Firm* — Merchant & Gould PC (57) ABSTRACT

A display apparatus is provided. The display apparatus includes a selection control unit which is configured to allow a user to input an operation for selecting one language from among a plurality of languages, a display control unit which is configured to display a specific character string corresponding to the selected language on a display unit, a download control unit which is configured to download first firmware corresponding to the selected language without downloading firmware corresponding to a language other than the selected language in a first case where new firmware is to be downloaded, and a storage control unit which is configured to store the first firmware in a memory.

17 Claims, 5 Drawing Sheets

(56) References Cited

FOREIGN PATENT DOCUMENTS

| | | |
|---|---|---|
| JP | 2005-072912 A | 3/2005 |
| JP | 2005-109791 A | 4/2005 |
| JP | 2005-313332 A | 11/2005 |
| JP | 2006-186886 A | 7/2006 |
| JP | 2006-195220 A | 7/2006 |
| JP | 2008-074023 A | 4/2008 |
| JP | 2008-225888 A | 9/2008 |
| JP | 2009-147524 A | 7/2009 |
| JP | 2009-217058 A | 9/2009 |

OTHER PUBLICATIONS

Japan Patent Office, Notification of Reasons for Refusal for Japanese Patent Application No. 2010-025116 (counterpart to above-referenced patent application), mailed Mar. 26, 2013.

* cited by examiner

DISPLAY APPARATUS WITH MEMORY STORING FIRMWARE AND NETWORK SYSTEM INCLUDING DISPLAY APPARATUS

CROSS-REFERENCE TO RELATED APPLICATION

This application claims priority from Japanese Patent Application No. 2010-025116, filed on Feb. 8, 2010, the entire subject matter of which is incorporated herein by reference.

TECHNICAL FIELD

Aspects of the present invention relate to a display apparatus that executes a process by using firmware.

BACKGROUND

For example, JP-A-2002-222068 discloses a display apparatus (printer) that executes a process by using firmware. The display apparatus compares a version of firmware currently stored in a memory thereof with a version of firmware stored in a server that manages the firmware. When the latter is a new version, compared to the former, the display apparatus downloads the firmware from the server.

SUMMARY

It is demanded a technique for effectively using a memory of a display apparatus. Accordingly, an aspect of the present invention provides a display apparatus capable of effectively using a memory.

According to an illustrative embodiment of the present invention, there is provide a display apparatus comprising: a selection control unit which is configured to allow a user to input an operation for selecting one language from among a plurality of languages; a display control unit which is configured to display a specific character string corresponding to the selected language on a display unit; a download control unit which is configured to download first firmware corresponding to the selected language without downloading firmware corresponding to a language other than the selected language in a first case where new firmware is to be downloaded; and a storage control unit which is configured to store the first firmware in a memory.

A control method for implementing the display apparatus and a computer program therefor are also novel and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION (Configuration of System)

Figure 1:
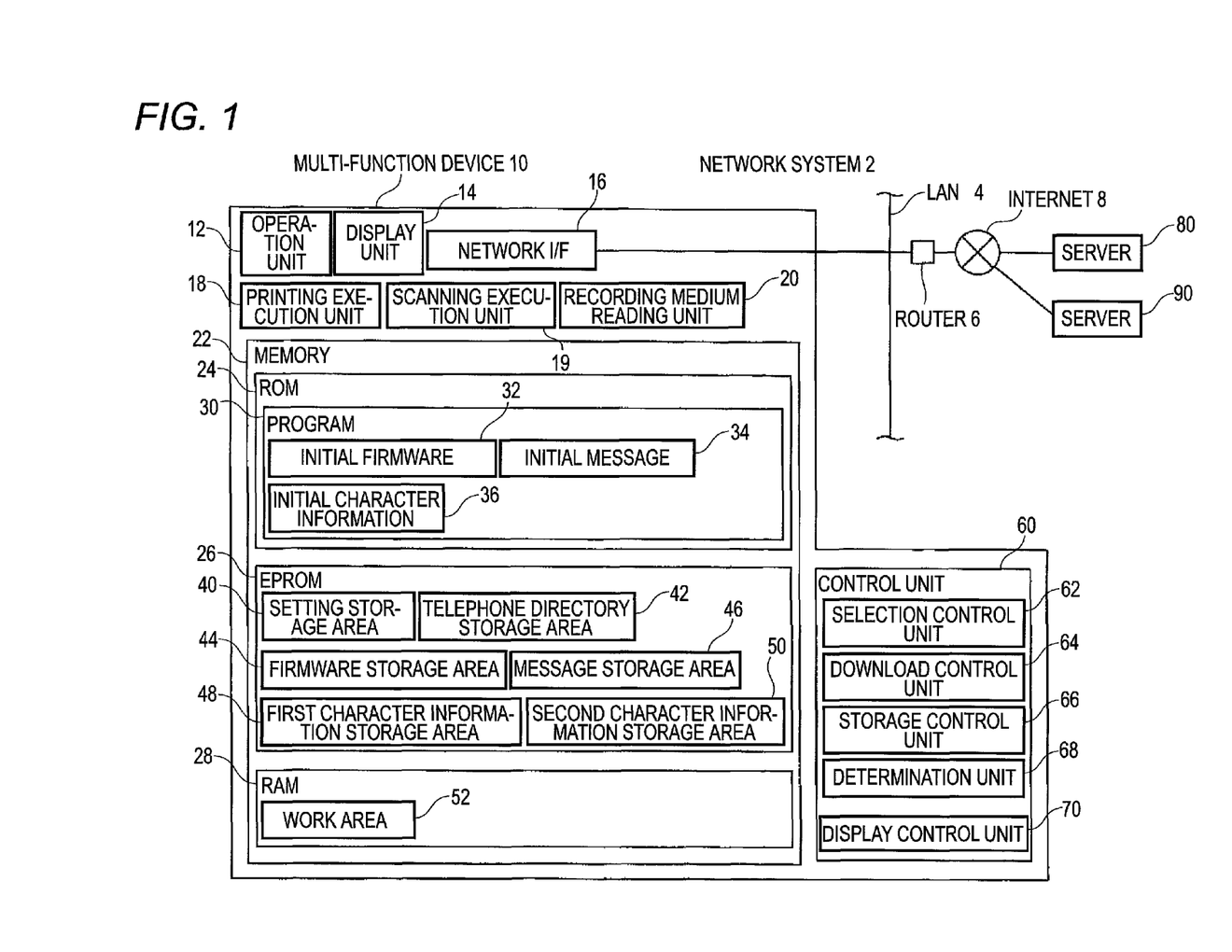
FIG. 1 shows a configuration of a network system according to an illustrative embodiment of the present invention.

Illustrative embodiments of the present invention will be described with reference to the drawings. FIG. 1 is a schematic view of a network system 2 of this illustrative embodiment. The network system 2 has a LAN 4, a router 6, the Internet 8, a multi-function device (an example of a display apparatus) 10 and a plurality of servers 80, 90. The router 6 and the multi-function device 10 are connected to the LAN 4. The router 6 is connected to the Internet 8. The servers 80, 90 are connected to the Internet 8. The multi-function device 10 and the servers 80, 90 can perform communication with the each other through the LAN 4 and the Internet 8.

(Configuration of Multi-Function Device 10)

A configuration of the multi-function device 10 will be described. The multi-function device 10 has a variety of functions, such as copying, printing, scanner, e-mail transmitting and receiving and telephone functions. The multi-function device 10 has an operation unit 12, a display unit 14, a network interface 16, a printing execution unit 18, a scanning execution unit 19, a recording medium reading unit 20, a memory 22 and a control unit 60. The operation unit 12 has a plurality of keys. A user can operate the operation unit 12 to input various instructions to the multi-function device 10. The display unit 14 is a display for displaying a variety of information. The network interface 16 is connected to the LAN 4. The printing execution unit 18 has a printing mechanism of an inkjet printing type, a laser printing type or the like and performs a printing operation in accordance with an instruction from the control unit 60. The scanning execution unit 19 has a scanning mechanism of CIS, CCD or the like and scans a scanning object to generate image data. The recording medium reading unit 20 reads out data that is recorded in various recording media such as USB memory, CD-ROM, DVD-ROM, memory card or the like.

The memory 22 has a ROM 24, an EPROM 26 and a RAM 28. The ROM 24 stores a program 30. The program 30 is stored in the multi-function 10 device in advance at a stage of shipment of the multi-function device 10. The program 30 includes initial firmware 32, initial messages 34 and initial character information 36. The initial firmware 32 includes programs enabling the control unit 60 to execute an initial setting process (refer to FIG. 2), a download process (refer to FIG. 3), a language change process (refer to FIG. 4) and an initialization process (not shown). The control unit 60 executes the processes in accordance with the initial firmware 32, so that functions of a selection control unit 62, a download control unit 64, a storage control unit 66, a determination unit 68 and a display control unit 70 of the control unit 60 are realized. The initial firmware 32 also includes programs enabling the control unit 60 to execute basic processes such as printing process, scanning process and copying process.

The initial messages 34 are character code strings corresponding to character strings that configure guidance messages for guiding an operation that should be executed by a user when performing an initial setting of the multi-function device 10. In the meantime, character codes are codes for expressing each character. For example, in ASCII coding, 'a' corresponds to '97' and 'b' corresponds to '98.' Hereinafter, the 'character code string corresponding to a character string that configures a message' is simply referred to as 'character code string of a message.' The initial messages 34 include character code strings of a plurality of guidance messages corresponding to a plurality of languages.

The initial character information 36 is character information (font) for converting the character code strings of the initial messages 34 into character information for display. The initial character information 36 includes a plurality of character information corresponding to a plurality of languages.

The EPROM 26 has a setting storage area 40, a telephone directory storage area 42, a firmware storage area 44, a message storage area 46, a first character information storage area 48 and a second character information storage area 50. At the stage of shipment of the multi-function device 10, information is not stored in the respective storage areas 40 to 50 of the EPROM 26. The setting storage area 40 is a storage area for storing various settings of the multi-function device 10 designated by a user. The setting storage area 40 includes information indicating a language selected by a user (hereinafter, referred to as "selected language'), for example. The telephone directory storage area 42 is a storage area for storing telephone directory information, which includes names (person names, company names and the like), e-mail addresses, telephone numbers, FAX numbers and the like.

The firmware storage area 44 is a storage area for storing downloaded firmware. The control unit 60 can execute a variety of processes in accordance with the firmware stored in the firmware storage area 44. The firmware stored in the firmware storage area 44 includes a program for executing a specific process other than the basic processes that are executed in accordance with the initial firmware 32. The specific process includes a process for automatic telephone response function, for example. In addition, a program for executing a telephone directory import process (refer to FIG. 5) is also firmware that is stored in the firmware storage area 44. Hereinafter, the firmware for executing the specific process is referred to as "specific firmware."

The message storage area 46 is a storage area for storing character code strings of various messages. The character code strings stored in the message storage area 46 include a character code string other than the character code strings of the initial messages 34. The first character information storage area 48 is a storage area for storing first character information for converting the character code strings stored in the message storage area 46 into character information for display. The second character information storage area 50 is a storage area for storing second character information for displaying a character when the character which cannot be displayed even with the first character information should be displayed. More specifically, the second character information is additional character information for displaying a character on the display unit 14 when the character included in the telephone directory information stored in the telephone directory storage area 42 cannot be displayed even with the first character information. The RAM 28 has a work area 52 for temporarily storing data to be printed, data generated by the control unit 60 and the like.

(Configuration of Servers 80, 90)

In this illustrative embodiment, the server 80 stores character code strings of messages, the first character information and the second character information. Hereinafter, the server 80 is also referred to as a "display information managing server.' A vendor of the multi-function device 10 stores the character code strings of messages, the first character information and the second character information in the display information managing server 80 in advance. The vendor of the multi-function device 10 stores character code strings of a plurality of messages in a plurality of languages in the display information managing server 80. Similarly, the vendor of the multi-function device 10 stores the first and second character information corresponding to the plurality of languages in the display information managing server 80. In the meantime, the server 90 stores the specific firmware for executing the specific process. Hereinafter, the server 90 is also referred to as a 'firmware managing server.' The vendor of the multi-function device 10 stores a plurality of specific firmware corresponding to the plurality of languages in the firmware managing server 90 in advance. In addition, when a new version of the specific firmware is developed, the vendor of the multi-function device 10 erases (deletes) the old version of the specific firmware from the firmware managing server 90 and stores the new version of the specific firmware (a plurality of specific firmware corresponding to the plurality of languages) in the firmware managing server 90. An example of each of the plurality of firmware corresponding to the plurality of languages is firmware for implementing an automatic telephone response function including a response process of a message in a corresponding language. For instance, the specific firmware corresponding to Japanese is firmware for implementing an automatic telephone response function including a response process in a Japanese message, and the specific firmware corresponding to English is firmware for implementing an automatic telephone response function including a response process of an English message. In this illustrative embodiment, URLs of the servers 80, 90 are respectively stored in the ROM 24 in advance. Thereby, when the multi-function device 10 is connected to the LAN 4, the multi-function device 10 can access to the respective servers 80, 90 through the LAN 4 and the Internet 8.

(Processes Executed by Multi-Function Device 10)

Next, the respective processes that are executed by the control unit 60 of the multi-function device 10 will be described with reference to FIGS. 2 to 5.

(Initial Setting Process)

First, the initial setting process that is executed when starting to use the multi-function device 10 of an initial state will be described. For example, the unused multi-function device 10 (i.e., the multi-function device 10 at the stage of shipment) has the initial state. In addition, the multi-function device 10 for which an initialization process has been performed also has the initial state. In the multi-function device 10 of the initial state, any information is not stored in the EPROM 26. When the multi-function device 10 of the initial state is powered on, the initial setting process of FIG. 2 starts. First, the display control unit 70 (refer to FIG. 1) displays language selection messages on the display unit 14 (S2). The language selection message is a message that prompts a user to select one of a plurality of languages (for example, Japanese, English, Chinese and the like). The language selection messages are displayed in a plurality of languages at the same time. The character code strings of the plurality of language selection messages in the plurality of languages are included in the initial messages 34. In S2, the display control unit 70 displays the plurality of language selection messages in the plurality of languages on the display unit 14 by using the character code strings of the plurality of language selection messages and the plurality of character information corresponding to the plurality of languages, which are included in the initial character information 36.

Next, the selection control unit 62 (refer to FIG. 1) receives an input of a selection operation for selecting one of the plurality of languages (S3). The user can operate the operation unit 12 of the multi-function device 10 to perform the selection operation.

Then, the selection control unit 62 (refer to FIG. 1) monitors whether the language selection is completed (S4). When the user selects one language in S3 and operates a key for completing the language selection, the selection control unit 62 determines YES in S4. When a result of S4 is YES, the storage control unit 66 (refer to FIG. 1) stores information indicating the language selected in S3 in the setting storage area 40 and the process proceeds to S6. In the meantime, when a result of S4 is NO, the process returns to S3.

Figure 2:
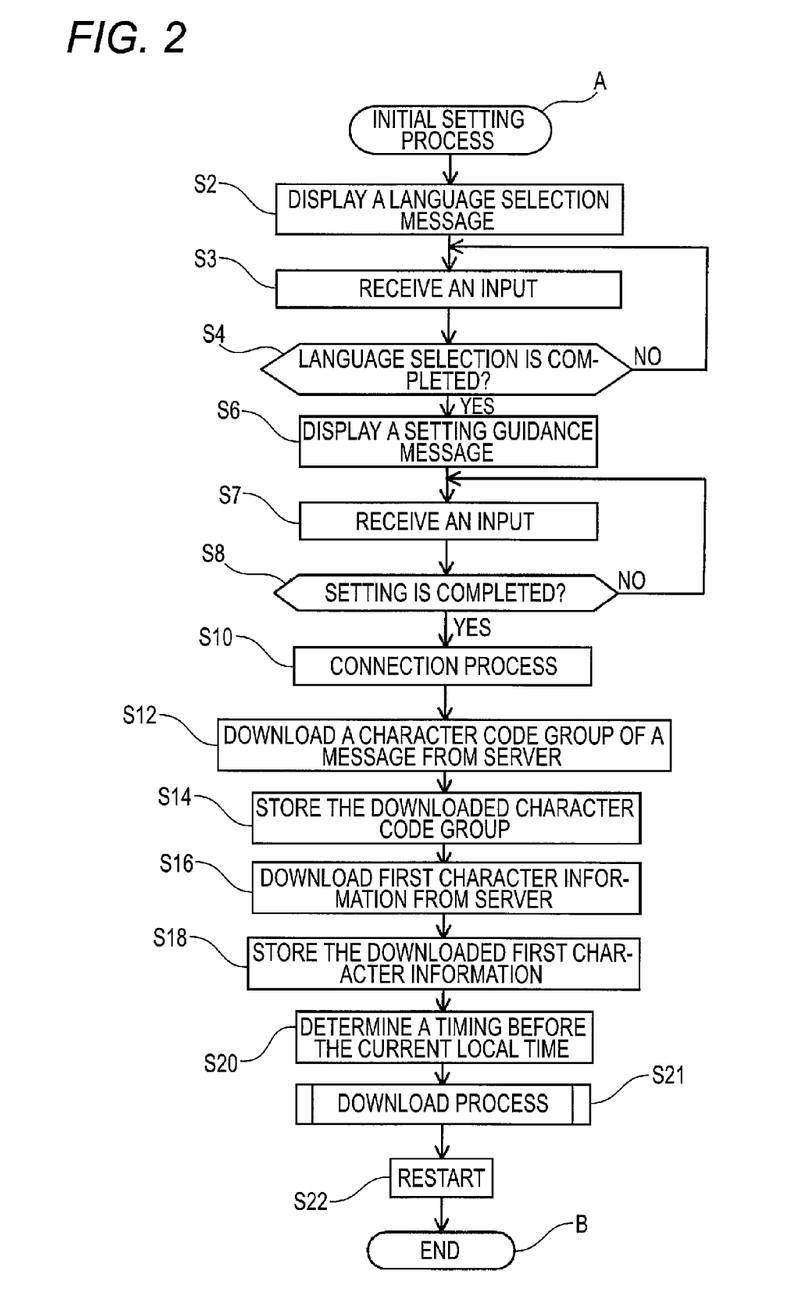
FIG. 2 is a flow chart of an initial setting process.

In S6, the display control unit 70 displays a setting guidance message on the display unit 14. The setting guidance message includes a message that prompts a user to execute an operation for connecting the multi-function device 10 to the LAN 4. For example, the setting guidance message is a message that prompts the user to connect a LAN cable to the network interface 16 of the multi-function device 10, to select a method of allotting an IP address to the multi-function device 10 (for example, a method by DHCP, a method by a manual and the like), to set local time corresponding to the selected language, and the like. In the meantime, when the selected language is Japanese, for example, the display control unit 70 displays current time of Japan (GMT (standard time)+09:00) and displays a message of asking the user whether to set the current time as local time. In addition, when the selected language is English, for example, the display control unit displays current times of a plurality of regions in the English-speaking area (for example, GMT+0 (London), GMT−08:00 (San Francisco), GMT−05:00 (New York) and the like) and displays a message that prompts the user to select one of the current times of the plurality of regions. The setting guidance message is displayed not in the plurality of languages but only in the selected language. The initial messages 34 include character code strings of a plurality of setting guidance messages corresponding to the plurality of languages including the selected language. In S6, the display control unit 70 displays, on the display unit 14, the setting guidance message in the selected language by using the character code string of the setting guidance message corresponding to the selected language and the character information corresponding to the selected language, which is included in the initial character information 36, based on the information indicating the selected language stored in the setting storage area 40.

Next, the control unit 60 receives an input of a setting operation for performing the various settings in accordance with the setting guidance messages (S7). The user can operate the operation unit 12 of the multi-function device 10 to perform the setting operations. Then, the control unit 60 monitors whether the settings are completed. When the user performs the various setting operations in S7 and operates a key for setting completion, the control unit 60 determines YES in S8. When a result of S8 is YES, the control unit 60 executes a connection process for connecting the multi-function device 10 to the LAN 4 (S10). In S10, the control unit 60 obtains communication setting information such as IP address of the multi-function device 10, subnet mask and the like from a DHCP server (not shown). The storage control unit 66 stores the obtained communication setting information of the multi-function device 10 in the setting storage area 40.

Next, the download control unit 65 (refer to FIG. 1) downloads character code strings of various messages corresponding to the selected language from the display information managing server 80 (S12). Specifically, in S12, the download control unit 64 first transmits a command to request transmission of character code strings of various messages to the display information managing server 80. The command includes the information indicating the selected language. The server 80 specifies, from character code strings of a plurality of messages corresponding to a plurality of languages stored in the server 80, a character code string of a message corresponding to the selected language, in accordance with the information indicating the selected language included in the command, and transmits the specified character code string of the message to the multi-function device 10. Thereby, the download control unit 64 of the multi-function device 10 downloads the character code string of the message corresponding to the selected language but does not download a character code string of a message corresponding to a language other than the selected language. The character code strings of various messages downloaded in S12 include the character code strings of various messages that are displayed on the display unit 14 when the multi-function device 10 performs the specific process. The storage control unit 66 stores the character code strings downloaded in S12 in the message storage area 46 (S14).

Next, the download control unit 64 downloads the first character information corresponding to the selected language from the display information managing server 80 (S16). Specifically, similarly to S12, in S16, the download control unit 64 transmits a command to request transmission of the first character information, which includes the information indicating the selected language, to the server 80. In the meantime, the information indicating the selected language may be information indicating Japanese, English and the like or information of a character code type. The server 80 specifies, from a plurality of first character information corresponding to the plurality of languages stored in the server 80, first character information corresponding to the selected language and transmits the first character information to the multi-function device 10. Thereby, the download control unit 64 of the multi-function device 10 downloads the first character information corresponding to the selected language but does not download first character information corresponding to a language other than the selected language. The storage control unit 66 stores the first character information downloaded in S16 in the first character information storage area 48 (S18).

Next, the control unit 60 determines, as the timing at which the specific firmware should be downloaded, a timing before the current local time (S20). Then, the process proceeds to S21 and executes a download process (refer to FIG. 3). When completing the download process of S21, the control unit 60 restarts the multi-function device 10 (S22). When the above processes are completed, the multi-function device 10 ends the initial setting process of FIG. 2.

(Download Process)

The download process of the specific firmware that is executed by the multi-function device 10 will be described with reference to FIG. 3. The download control unit 64 determines whether the current local time passes over the timing determined in S20 of FIG. 2 (S32). As described above, in S20 of FIG. 2, the timing before the current local time has been determined. Accordingly, in S32, the download control unit 64 determines YES.

When a result of S32 is YES, the download control unit 64 determines whether it is necessary to download the specific firmware (S34). First, the download control unit 64 determines whether the specific firmware is already stored in the firmware storage area 44. For example, in S34 of the download process that is executed after S20 of FIG. 2, the specific firmware is not still stored in the firmware storage area 44. In this case, the download control unit 64 determines YES in S34. When a result of S32 is YES, the process proceeds to S36.

In S36, the storage control unit 66 releases the storage area of the specific firmware in the firmware storage area 44. In this illustrative embodiment, the storage control unit 66 erases (delete) the specific firmware to release the storage area. In the meantime, when the specific firmware is not stored in the firmware storage area 44, the storage control unit 66 omits process of S36. Then, the download control unit 64 downloads the specific firmware corresponding to the selected language from a plurality of firmware corresponding to the plurality of languages, which is stored in the firmware managing server 90 (S38). Specifically, in S38, the download control unit 64 transmits a command to request transmission of the specific firmware. This command includes the information indicating the selected language. The firmware managing server 90 specifies the specific firmware corresponding to the selected language from the plurality of firmware corresponding to the plurality of languages in accordance with the information indicating the selected language, which is included in the command. In addition, the firmware managing server 90 presumes a region where the multi-function device 10 is located, based on an IP address (IP address of WAN of the router of the LAN to which the multi-function device 10 belongs) of the multi-function device 10 that is a transmission source of the command, and determines whether the specific firmware is appropriate. If it is determined that the specific firmware is appropriate, the firmware managing server 90 transmits the specified specific firmware to the multi-function device 10. Thereby, the download control unit 64 of the multi-function device 10 downloads the specific firmware corresponding to the selected language but does not download the specific firmware corresponding to a language other than the selected language. The storage control unit 66 stores the specific firmware downloaded in S38 in the firmware storage area 44 and changes a start address of the specific firmware (S40). When the specific firmware is stored, the control unit 60 can execute the specific process in accordance with the specific firmware.

Next, the determination unit 68 determines a next timing at which the specific firmware should be downloaded in accordance with the selected language (S42). Specifically, the determination unit 68 determines, as the timing, a timing within a time zone in which a using frequency of the multi-function device 10 is expected to be low, for example. For example, the determination unit 68 specifies a time within a night time zone of the local time that is currently set in the multi-function device 10 and determines the time as the timing of the next download. When the above processes are completed, the download process ends.

As described above, the control unit 60 executes the download process of the first time, as a partial process of the initial process of FIG. 2. Further, while the multi-function device 10 is powered on, the control unit 60 repeatedly executes the download process. In other words, in the download process of second or later time, the download control unit 64 determines whether the current local time passes over the timing determined in the process of S42 (S32). In S34, the download control unit 64 accesses to the firmware managing server 90 to obtain version information of the specific firmware that is currently stored in the firmware managing server 90. The download control unit 64 compares version information of the specific firmware that is currently stored in the firmware storage area 44 and the version information obtained from the firmware managing server 90. When the latter is a new version, compared to the former, the download control unit determines YES in S34. The processes of S36 to S42 are the same as those of the download process of the first time. For example, in the process of S42, a time in the night time zone of a next day is determined as a timing of a next download.

(Language Change Process)

Next, the language change process, which is executed by the multi-function device 10 when the selected language is changed into another language, will be described with reference to FIG. 4. A user can operate the operation unit 12 of the multi-function device 10 to execute an operation of changing the language selected in S4 of FIG. 2 into another language. When the operation is executed, the storage control unit 66 erases (deletes) the information (i.e., character code strings) in the message storage area 46 to release the message storage area 46 (S50). Next, the download control unit 64 downloads a character code string of a message corresponding to the changed language from the display information managing server 80 (S52). The download method is the same as S12 of FIG. 2. In other words, the download control unit 64 downloads the character code string of the message corresponding to the changed language but does not download a character code string of a message corresponding to a language other than the changed language. The storage control unit 66 stores the character code string downloaded in S52 in the message storage area 46 (S54).

Next, the storage control unit 66 erases (deletes) the information (i.e., first and second character information) in the first and second character information storage areas 48, 50 to release the first and second character information storage areas 48, 50 (S56). In the meantime, when the second character information is not stored in the second character information storage area 50, the storage control unit 66 releases only the first character information storage area 48 in S56. Then, the download control unit 64 downloads the first character information corresponding to the changed language from the display information managing server 80 (S58). The download method is the same as S16 of FIG. 2. In other words, the download control unit 64 downloads the first character information corresponding to the changed language but does not download the first character information corresponding to a language other than the changed language. The storage control unit 66 stores the first character information downloaded in S58 in the first character information storage area 48 (S60).

Next, the storage control unit 66 erases (delete) the information (i.e., the specific firmware) in the firmware storage area 44 to release the firmware storage area 44 (S62). Then, the download control unit 64 downloads the specific firmware corresponding to the changed language from the firmware managing server 90 (S64). The download method is the same as S38 of FIG. 3. In other words, the download control unit 64 downloads the specific firmware corresponding to the changed language but does not download the specific firmware corresponding to a language other than the changed language. The storage control unit 66 stores the specific firmware downloaded in S64 in the firmware storage area 44 (S66). When the above processes are completed, the multi-function device 10 ends the language change process.

(Telephone Directory Import Process)

Next, the telephone directory import process that is executed by the multi-function device 10 will be described with reference to FIG. 5. While a recording medium (for example, CD-ROM, USB memory and the like) is put in the recording medium reading unit 20 (refer to FIG. 1) of the multi-function device 10, a user can operate the operation unit 12 of the multi-function device 10 to input an instruction for reading out telephone directory information from the recording medium. When the instruction is input, the control unit 60 instructs the recording medium reading unit 20 to read out the telephone directory information from the recording medium. Thereby, the telephone directory information is read out (S80). The storage control unit 66 stores the telephone directory information read in S80 in the telephone directory storage area 42 (refer to FIG. 1) (S82). Then, the control unit 60 determines whether the telephone directory information stored in the telephone directory storage area 42 includes a character that cannot be displayed even with the first character information currently stored in the first character information storage area 48 (S84). Specifically, in S83, the control unit 60 determines whether character codes of the respective characters included in the telephone directory information can be converted into each character by using the first character information. When a result of S84 is YES, the process proceeds to S86. In the meantime, when a result of S84 is NO, the multi-function device 10 ends the telephone directory import process.

In S86, the download control unit 64 downloads the second character information from the character information managing server 80. The download method is the same as the download method of the first character information (S16 of FIG. 2 and S58 of FIG. 4). That is, the download control unit 64 downloads the second character information corresponding to the selected language but does not download the second character information corresponding to a language other than the selected language. The second character information is additional character information for displaying the character, which cannot be displayed, on the display 14. An example of the first character information and the second character information will be described for a case where the selected language is "Japanese." The first character information includes at least character information for converting the character code strings of the various messages stored in the message storage area 46 into character information for display. In other words, the first character information includes character information for general-purpose characters having a high using frequency (for example, hiragana, katakana, alphabets, Chinese characters having a high using frequency, symbols having a using frequency and the like). In the meantime, the second character information includes characters, which cannot be displayed even with the first character information, i.e., auxiliary characters that are not included in the general-purpose characters (for example, Chinese characters having a low using frequency, which may be included in person names). When the process of S86 is completed, the storage control unit 66 stores the second character information downloaded in S86 in the second character information storage area 50 (S88). When the respective processes are completed, the multi-function device 10 ends the telephone directory import process.

(Initialization Process)

Next, an initialization process of returning the multi-function device 10 to the above-described initial state will be described. A user can operate the operation unit 12 of the multi-function device 10 to input an instruction for returning the multi-function device 10 to the initial state. When the instruction is input, the storage control unit 66 erases (deletes) the respective information in the respective storage areas 40 to 50 of the EPROM 26, thereby releasing the respective storage areas 40 to 50. As a result, any information is not stored in the respective storage areas 40 to 50 in the EPROM 26 and the start address of the firmware is returned to the head of the initial firmware 32. In other words, the multi-function device 10 is initialized. Then, the control unit 60 restarts the multi-function device 10. In this case, at the restart, the initial setting process of FIG. 2 is executed again.

(Other Processes)

Next, the other processes that are executed by the multi-function device 10 will be described. The control unit 60 executes the specific process (for example, process for an automatic telephone response function and the like) in accordance with the specific firmware stored in the firmware storage area 44. In addition, when a user operates the operation unit 12, the display control unit 70 displays a character string corresponding to the operation (hereinafter, referred to as 'specific character string'). This display process may be executed in accordance with the initial firmware 32 or in accordance with the specific firmware. In the display process, the display control unit 70 displays the specific character string by using the character code strings of messages stored in the message storage area 46 and the first character information stored in the first character information storage area 48. In other words, in the display process, the display control unit 70 displays the specific character string corresponding to the selected language on the display unit 14. In addition to the above, the control unit 60 can execute a variety of processes (for example, a process of enabling the printing execution unit 18 to perform a printing operation in accordance with printing data). However, the detailed descriptions thereof will be omitted.

In the above, the illustrative embodiment has been described. According to the above-described illustrative embodiment, as shown in S2 and S3 of FIG. 2, the multi-function device 10 permits a user to select one of a plurality of languages. Through executing the above-described display process, the multi-function device 10 can display the specific character string corresponding to the selected language on the display unit 14. Accordingly, the user can select one language that the user can understand and can see the specific character string in the language. In addition, as shown in S38 of FIG. 3, the multi-function device 10 downloads the specific firmware for executing the specific process corresponding to the selected language, but does not download the specific firmware for executing the specific process corresponding to a language other than the selected language. Thus, the unnecessary firmware is not stored in the memory 22 (more specifically, EPROM 26), and therefore, it is possible to reduce an amount of information that should be stored in the memory 22, so that it is possible to effectively use the memory 22. In the meantime, the multi-function device 10 downloads the specific firmware corresponding to the region presumed on the basis of the IP address, but does not download the other firmware other than the firmware. Thus, it is possible to selectively download firmware suitable for laws and standards of the region where the multi-function device 10 is located, and therefore, it is possible to reduce an amount of information that is stored in the memory 22. The firmware suitable for laws and standards of a region may include firmware including setting information such as available channel range and output power, which are determined as standards for each country (or region), regarding wireless LAN functions, for example.

Figure 4:
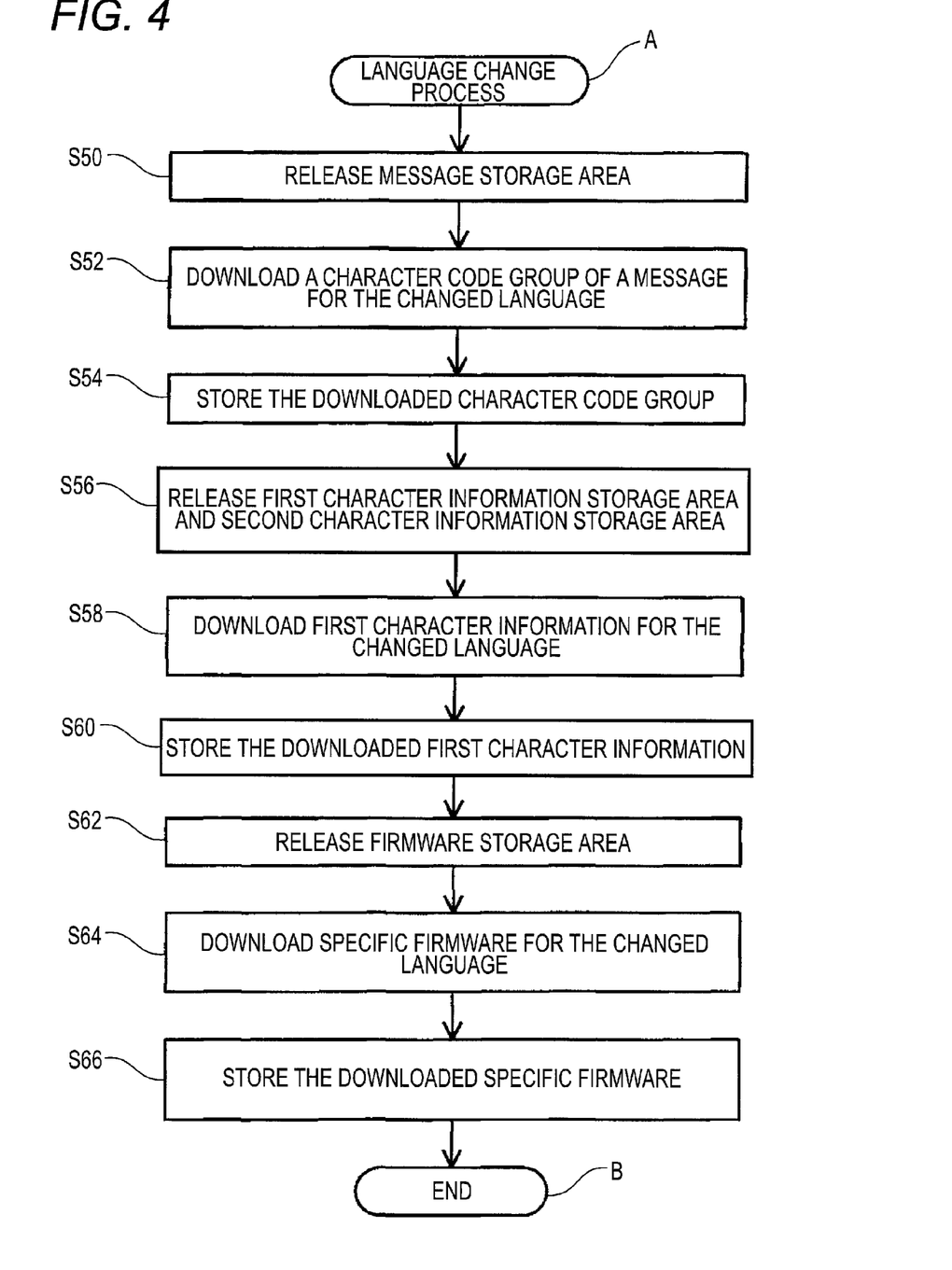
FIG. 4 is a flow chart of a language change process.

In the above-described illustrative embodiment, as shown in the language change process of FIG. 4, when the selected language is changed, the multi-function device 10 downloads the specific firmware for executing the specific process corresponding to the changed language, but does not download the specific firmware for executing the specific process corresponding to a language other than the changed language. Thus, the unnecessary firmware is not stored in the memory 22, and therefore, it is possible to effectively use the memory 22. Furthermore, as shown in S62 of FIG. 4, the multi-function device 10 erases (deletes) the specific firmware corresponding to the previously selected language before the change, which is not necessary due to the change of language. Thus, it is possible to use the memory 22 more efficiently.

Figure 3:
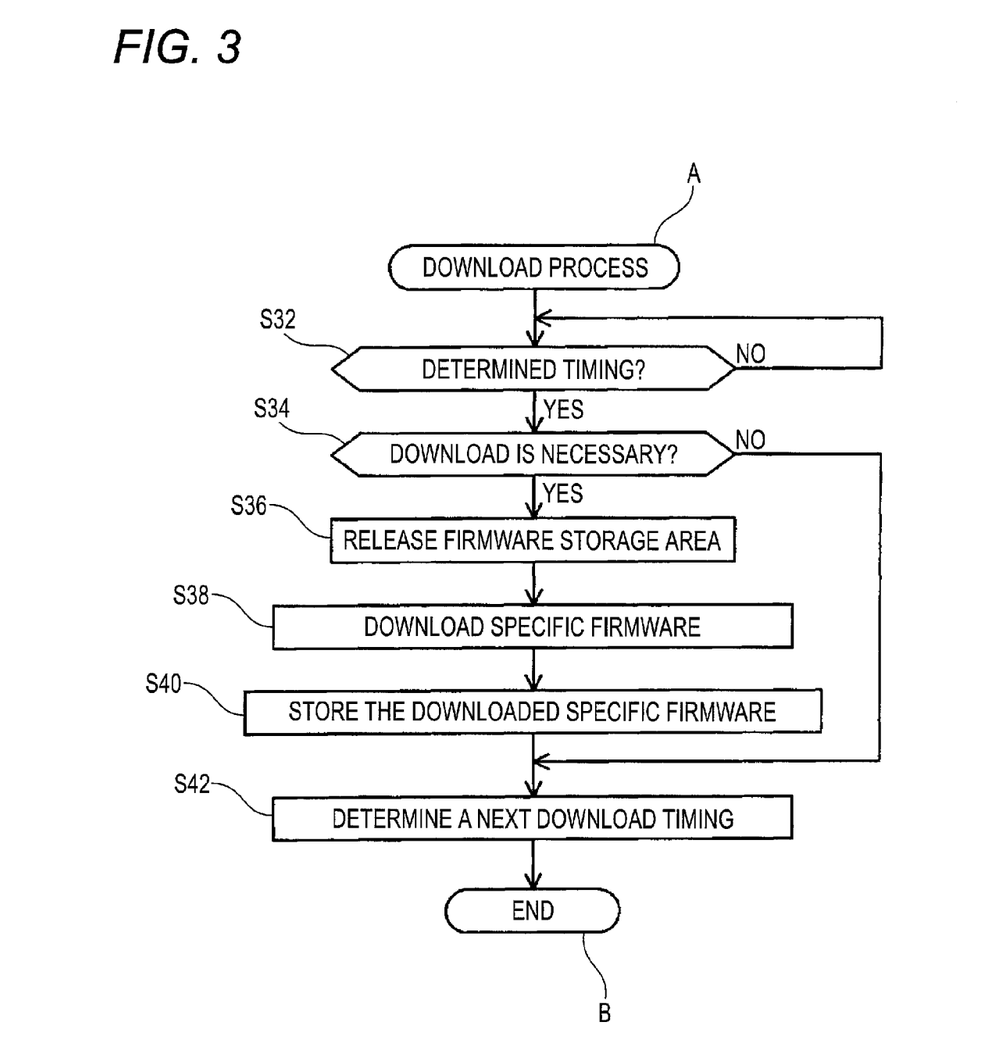
FIG. 3 is a flow chart of a download process.

In the above-described illustrative embodiment, as shown in S42 of FIG. 3, the multi-function device 10 can determine a timing suitable for the download of the specific firmware in accordance with the selected language. In this illustrative embodiment, the night time zone of the local time is set as the timing. As a result, the multi-function device 10 downloads the specific firmware at the night time zone. Typically, the using frequency of the multi-function device 10 is low in the night and is high in the daytime. Therefore, if the specific firmware is downloaded in the daytime during which the using frequency of the multi-function device 10 is high, it may be high a possibility that a timing at which a user desires to use the multi-function device 10 and a timing at which the specific firmware is downloaded will be matched. As a result, the user may feel displeasure. That is, while the specific firmware is being downloaded, the multi-function device 10 may not execute the other processes or it takes much time for the multi-function device to execute the other processes. However, in the above-described illustrative embodiment, since the specific firmware is downloaded in the night during which the using frequency of the multi-function device 10 is low, a possibility that a user will feel displeasure is low.

In this illustrative embodiment, as shown in S12 to S18 of FIG. 2, the multi-function device 10 downloads the character code string of the message and the first character information corresponding to the selected language but does not download the character code string of the message and the first character information corresponding to a language other than the selected language. Thus, the unnecessary information is not stored in the memory 22, so that it is possible to effectively use the memory 22.

In the above-described illustrative embodiment, the initial messages 34 and the initial character information 36 corresponding to the plurality of languages are stored in the ROM 24 of the memory 22 in advance. Therefore, the multi-function device 10 can display the setting guidance messages in the selected language before it is connected to the LAN 4 (i.e., before the multi-function device downloads the character code string of the message and the first character information).

Figure 5:
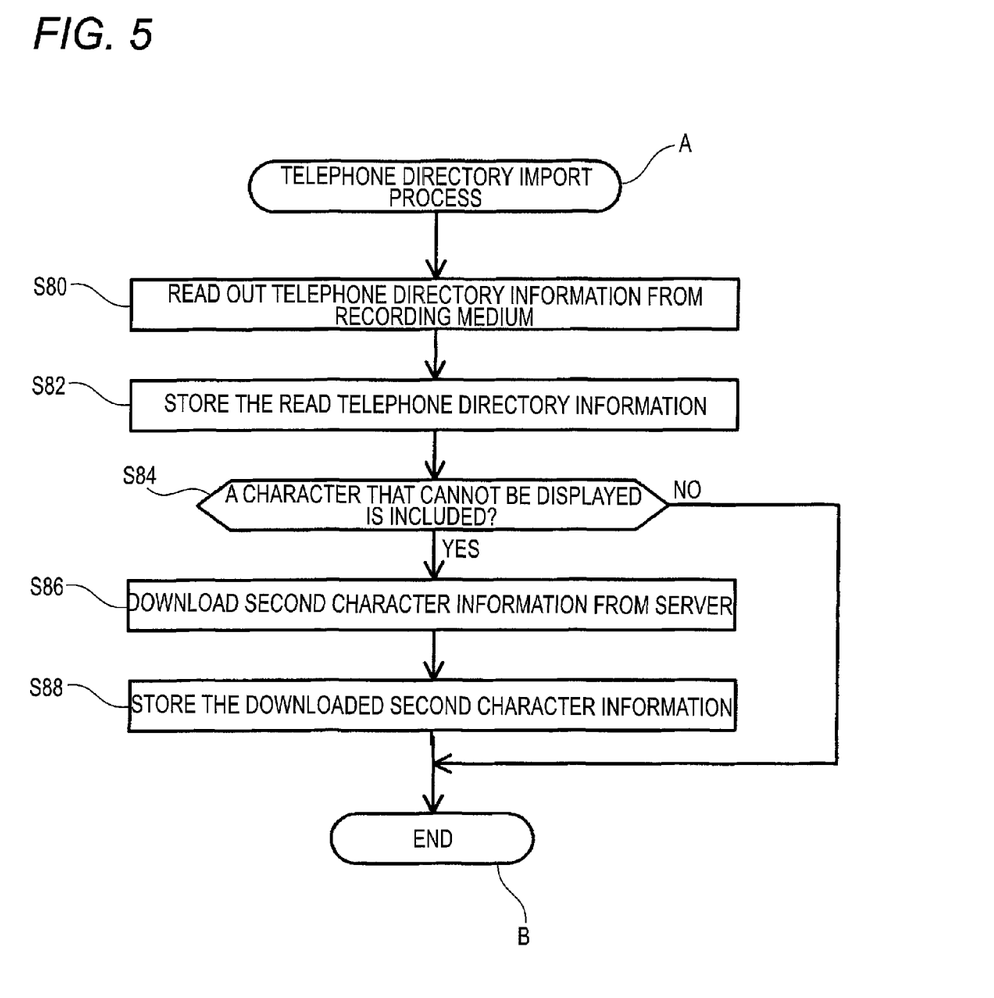
FIG. 5 is a flow chart of a telephone directory import process.

In the above-described illustrative embodiment, as shown in the telephone directory import process of FIG. 5, when the character that cannot be displayed even with the first character information should be displayed on the display unit 14 (i.e., when a result of S84 is YES), the multi-function device 10 downloads the second character information. As a result, the multi-function device 10 can display the character that cannot be displayed. Since the second character information is not downloaded until a result of S84 is YES, it is possible to reduce an amount of information that should be stored in the memory 22, so that it is possible to effectively use the memory 22.

Modified embodiments of the illustrative embodiment will be described.

(1) In the above illustrative embodiment, the multi-function device 10 is described as an example of a display apparatus. However, the present invention is not limited thereto. The inventive concept of the present invention can be applied to any apparatus having a display unit, for example, a peripheral device connectable to a computer or the like.

(2) The download control unit 64 may download at least one information of the character code string of the message, the first and second character information and the specific firmware from a recording medium having recorded the information therein, rather than the servers 80, 90. In addition, the download of the specific firmware may not be executed at the timing determined in S42 of FIG. 3 and may be executed in accordance with an instruction of a user. When a user operates the operation unit 12 to import the telephone directory, it may be possible to prompt the user to determine a timing for executing the download.

(3) In S42 of FIG. 3, the determination unit 68 may transmit the information indicating the selected language to the firmware managing server 90. In this case, the firmware managing server 90 may specify a timing (for example, night time zone) at which the multi-function device 10 should execute the download of the specific firmware, based on the selected language, and then transmit the specified timing to the multi-function device 10. In this case, the determination unit 68 may determine, as the timing for executing the download of the specific firmware, the timing obtained from the server 90.

What is claimed is:

1. A display apparatus comprising:
a memory;
a control unit configured to:
   allow a user to input an operation for selecting one language from among a plurality of languages;
   display a specific character string corresponding to the selected language on a display unit;
   determine a download timing when new firmware is to be downloaded, based on the selected language;
   download first firmware corresponding to the selected language without downloading firmware corresponding to a language other than the selected language at the determined download timing in a first case where new firmware is to be downloaded; and
   store the first firmware in the memory.

2. The display apparatus according to claim 1,
wherein the first case includes a case where firmware which is stored in the memory is to be updated into the new firmware.

3. The display apparatus according to claim 1,
wherein the control unit is further configured to:
   allow a user to change the selected language into another language among the plurality of languages;
   in a second case where the selected language is changed, download second firmware corresponding to the changed language without downloading firmware corresponding to a language other than the changed languages; and
   release a storage area of the first firmware and store the second firmware in the memory in the second case.

4. The display apparatus according to claim 1,
wherein the control unit is configured to determine the download timing based on a local time at a region where the selected language is used.

5. The display apparatus according to claim 4,
wherein the control unit is configured to determine a night time zone of the local time at the region as the download timing.

6. The display apparatus according to claim 1,
wherein the control unit is further configured to release a storage area of the first firmware in a third case where the memory is to be returned to an initial state.

7. The display apparatus according to claim 1,
wherein the control unit is further configured to:
   allow a user to input the operation for selecting one language when an initial setting of the display apparatus is performed;
   download first display information for displaying the specific character string corresponding to the selected language on the display unit without downloading display information for displaying a character string corresponding to a language other than the selected language, when the initial setting of the display apparatus is performed;
   store the first display information in the memory; and
   display the specific character string using the first display information stored in the memory.

8. The display apparatus according to claim 7,
wherein the memory stores a plurality of guidance messages in the plurality of languages,
wherein each of the guidance messages is for guiding a user operation for connecting the display apparatus to a network, and wherein the control unit is further configured to display a guidance message in the selected language among the plurality of guidance messages when the initial setting of the display apparatus is performed.

9. The display apparatus according to claim 7,
wherein when displaying a character on the display unit, which cannot be displayed even using the first display information stored in the memory, the control unit is configured to further download second display information for displaying the character on the display unit, and store the second display information in the memory.

10. The display apparatus according to claim 9,
wherein the control unit is configured to download the second display information at a separate and later timing from a timing when the initial setting of the display apparatus is performed.

11. The display apparatus according to claim 7,
wherein the control unit is further configured to:
read telephone directory information from an external recording medium;
determine whether the telephone directory includes a character which cannot be displayed even using the first display information stored in the memory;
download second display information for displaying the character on the display unit if it is determined that the telephone directory includes the character which cannot be displayed even using the first display information; and
store the second display information in the memory.

12. A network system comprising:
a server which stores a plurality of firmware corresponding to a plurality of languages, each firmware corresponding to a specific function;
a display apparatus connected to the server via a network, the display apparatus including:
a display unit;
a memory; and
a control unit configured to:
allow a user to input an operation for selecting one language from among the plurality of languages;
display a specific character string corresponding to the selected language on the display unit;
download first firmware corresponding to the selected language among the plurality of firmware without downloading firmware corresponding to a language other than the selected language from the server; and
store the first firmware in the memory,
wherein the server is configured to presume a region where the display apparatus is located based on an IP address received from the display apparatus, and cause the display apparatus to download a firmware based on the presumed region,
wherein the control unit of the display apparatus is further configured to:
determine a download timing when new firmware is to be downloaded, based on the selected language, and
download the first firmware at the determined download timing.

13. A display apparatus comprising:
a memory;
a control unit configured to:
allow a user to input an operation for selecting one language from among a plurality of languages when an initial setting of the display apparatus is performed;
download first display information for displaying a specific character string corresponding to the selected language on a display unit without downloading display information for displaying a character string corresponding to a language other than the selected language, when the initial setting of the display apparatus is performed;
store the first display information in the memory;
display the specific character string corresponding to the selected language on the display unit using the first display information stored in the memory;
download first firmware corresponding to the selected language without downloading firmware corresponding to a language other than the selected language in a first case where new firmware is to be downloaded; and
store the first firmware in the memory.

14. The display apparatus according to claim 13,
wherein the memory stores a plurality of guidance messages in the plurality of languages,
wherein each of the guidance messages is for guiding a user operation for connecting the display apparatus to a network, and
wherein the control unit is further configured to display a guidance message in the selected language among the plurality of guidance messages when the initial setting of the display apparatus is performed.

15. The display apparatus according to claim 13,
wherein when displaying a character on the display unit, which cannot be displayed even using the first display information stored in the memory, the control unit is configured to further download second display information for displaying the character on the display unit, and store the second display information in the memory.

16. The display apparatus according to claim 15,
wherein the control unit is configured to download the second display information at a separate and later timing from a timing when the initial setting of the display apparatus is performed.

17. The display apparatus according to claim 13,
wherein the control unit is configured to:
read telephone directory information from an external recording medium; and
determine whether the telephone directory includes a character which cannot be displayed even using the first display information stored in the memory,
download second display information for displaying the character on the display unit if it is determined that the telephone directory includes the character which cannot be displayed even using the first display information, and
store the second display information in the memory.

* * * * *